March 27, 1928.

A. WICKNER

CHUCK FOR HAND TOOLS

Filed Nov. 15, 1924

1,664,236

WITNESS:
Gus. Hjelm.

INVENTOR:
A. Wickner
BY
H. J. Sanders
ATTORNEY.

Patented Mar. 27, 1928.

1,664,236

UNITED STATES PATENT OFFICE.

AXEL WICKNER, OF CHICAGO, ILLINOIS.

CHUCK FOR HAND TOOLS.

Application filed November 15, 1924. Serial No. 750,164.

This invention relates to improvements in chucks for hand tools such as hand drills, screw drivers, and the like and its object is to provide a simple practical device of the kind that is efficient in use, cheap to manufacture, and easily applied to or removed from the tool.

With the foregoing and other objects in view the invention consists in the combination and arrangement of parts to be hereinafter fully described, pointed out in the appended claim and illustrated in the accompanying drawings which form a part of this application and in which—

Like reference characters denote corresponding parts throughout the several views.

Figure 1:
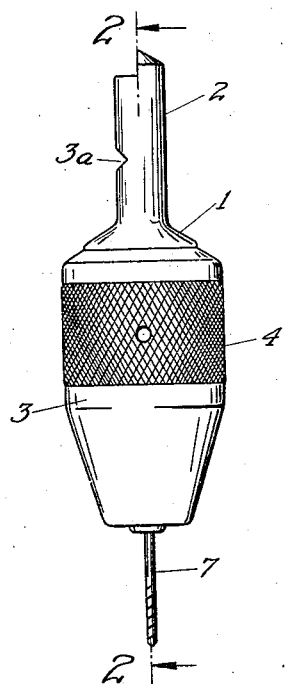
Fig. 1 is a view in elevation of a chuck embodying one form of the invention.

The reference numeral 1 denotes the body of the chuck which is integral with the shank 2 that is formed with the notch 3ª to permit its operative engagement with the socket of the tool to which it is applied, said body being threaded peripherally to receive the interiorly threaded sleeve 3 which is formed with the knurled portion 4.

The sleeve 3 is tapered at one end and formed with the jaw opening 5 through which the jaws 6, two in number, extend; said jaws carrying the drill 7 or other tool with which they may be provided. The jaws 6 at their tool-carrying end are beveled to conform to the shape of the end of the sleeve 3 and are formed with aligned recesses or grooves 8 to receive the tool. The jaws are further formed with oppositely disposed recesses 9 to receive the ends of the connecting spring 10 that tends yieldingly to force the jaws apart.

Figure 2:
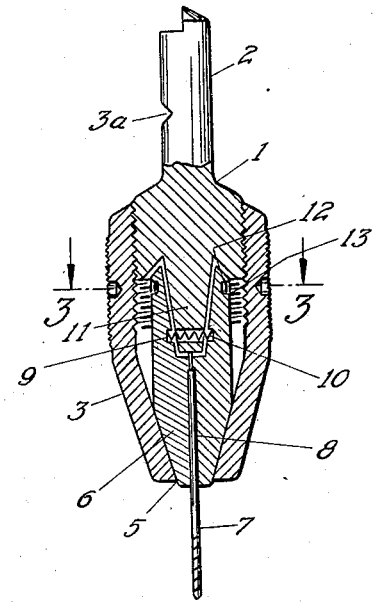
Fig. 2 is a longitudinal sectional view through the chuck and is taken on line 2—2 of Fig. 1.
Figure 3:
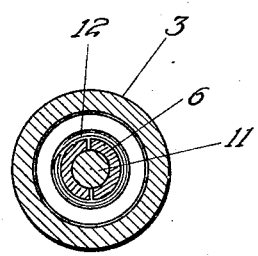
Fig. 3 is a cross section through the chuck and is taken on line 3—3 of Fig. 2.
Figure 4:
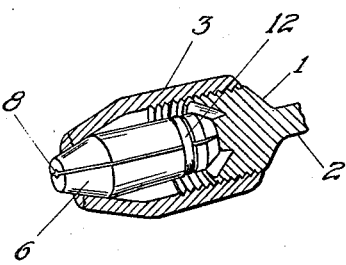
Fig. 4 is a longitudinal sectional view through Fig. 3.

Referring now to Figs. 1, 2, 3 and 4 the jaws 6 at their inner ends are recessed along their adjacent faces to receive the extension 11 integral with the body 1 which extension is perforated for passage therethrough of the said spring 10 which thereby connects said extension and the jaws, the body 1 being recessed about the extension 11 to afford clearance for the inner ends of the jaws 6. The jaws 6 are formed at their inner ends with a surface recess 12 for the annular spring 13 which tends to bring the inner ends of the jaws together against the said extension 11. This construction provides a compact chuck that operates as a unit and is readily assembled or taken apart when desired.

The spring 10 is housed in the recess 9 and bears at its ends against the inner surfaces of the jaws 6 and is under tension with a tendency to force the jaws away from each other. The annular band spring 13 circumscribes the jaws along a line lying between the inner ends of the jaws and the spring 10 and the said spring 13 is under tension with a tendency to hold the inner surfaces of the inner end portions of the jaws is contact with the surface of the conical extension 11 when the tool pin 7 should not interpose between the jaws. Thus, means are provided for holding the jaws in position with relation to the extension so that tool bits of different diameters may be readily inserted between the jaws and when the sleeve is tightened upon the body, the tool bit which is inserted between the jaws is firmly clamped between them.

What is claimed is:—

A chuck comprising a threaded body having a frusto conical extension formed integrally therewith and provided with a transversely disposed recess, a sleeve engaging the thread of the body and housing said extension, jaws disposed at opposite sides of the extension and engaging the inner surface of the sleeve, a spring located in said recess and bearing against the inner surfaces of the jaws and a band spring circumscribing the jaws around a line lying between the inner ends of the jaws and the first-mentioned spring.

In testimony that I claim the foregoing as my own I have hereto affixed my signature.

AXEL WICKNER.